Patented Oct. 27, 1931

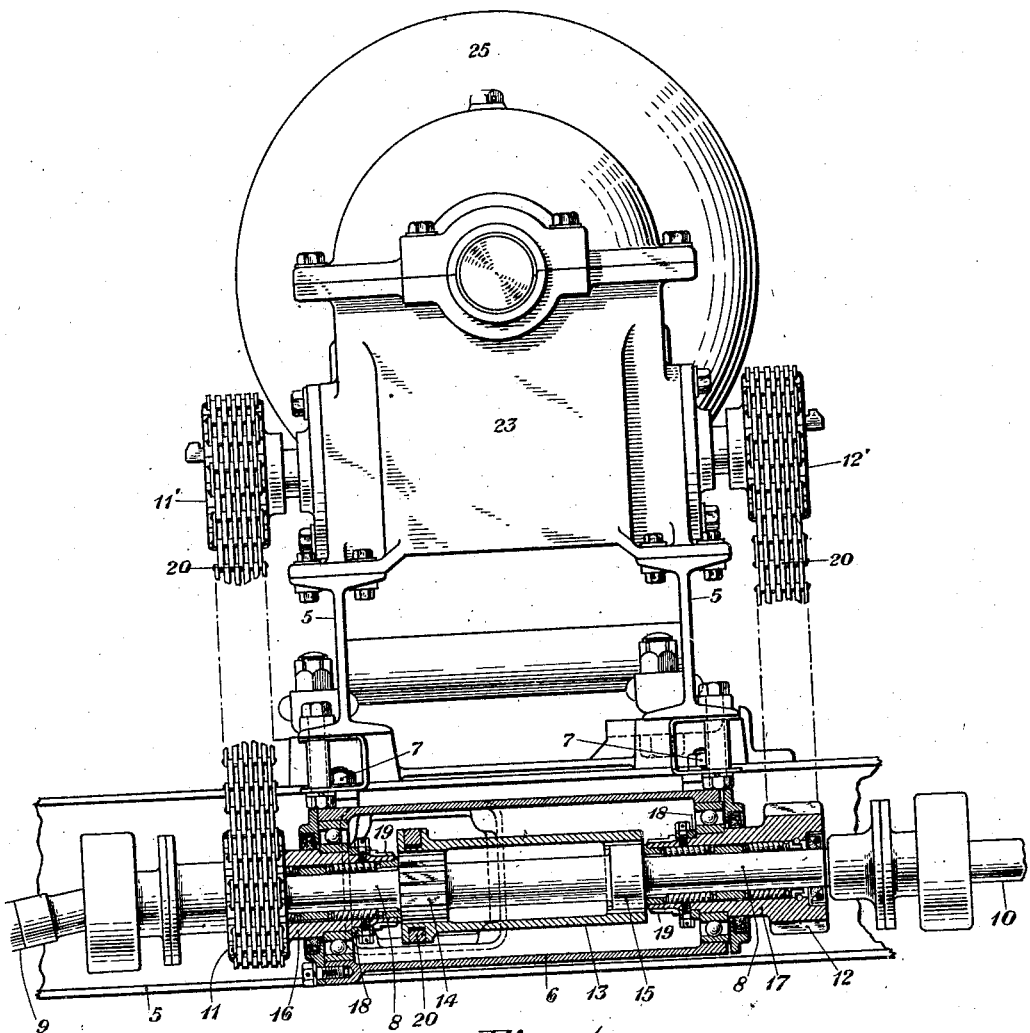

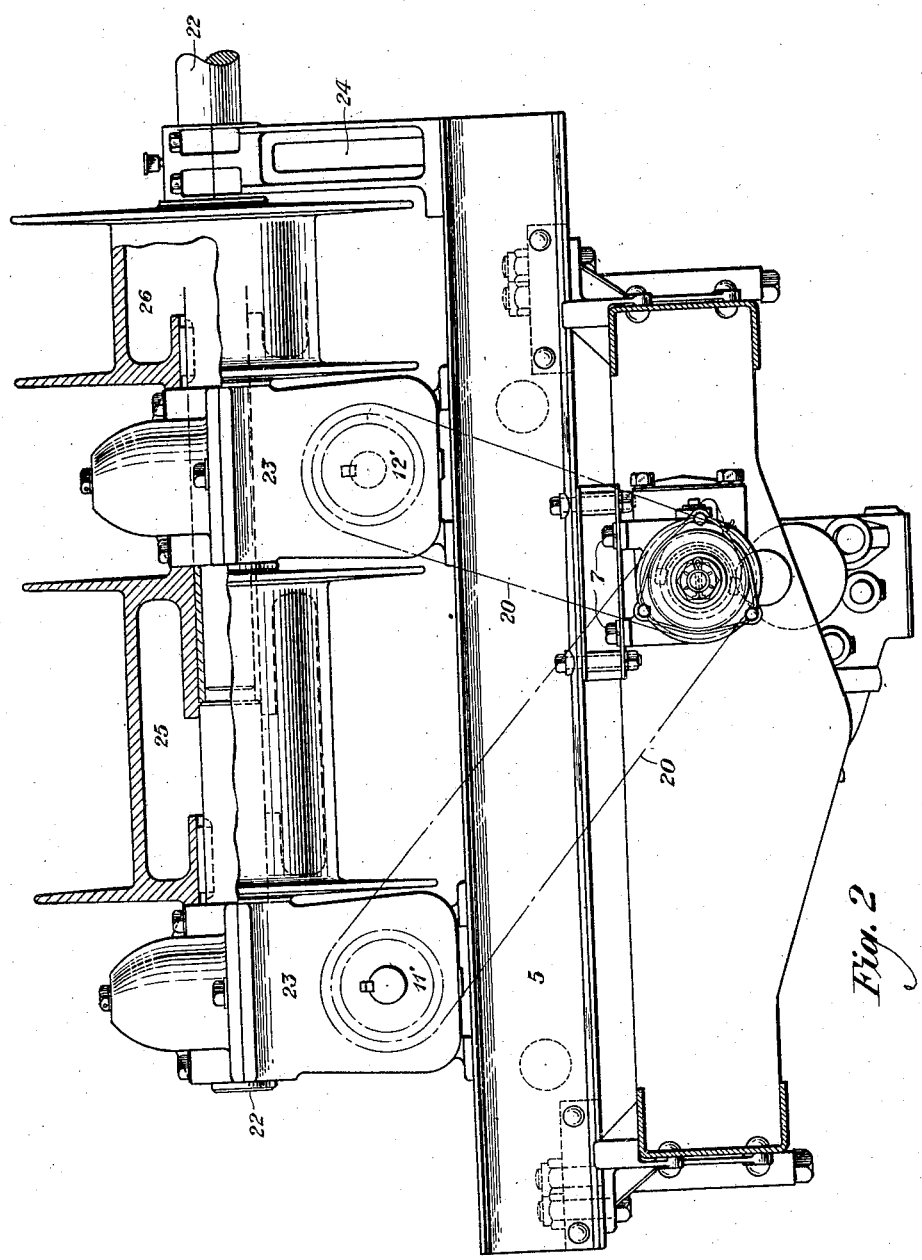

1,828,803

UNITED STATES PATENT OFFICE

ALBERT E. FREEMAN, OF EAST ORANGE, AND WILLIAM T. LIVERMORE, OF WESTFIELD, NEW JERSEY, ASSIGNORS TO AMERICAN TELEPHONE AND TELEGRAPH COMPANY, A CORPORATION OF NEW YORK

MULTIPLE DRIVE APPARATUS

Application filed February 26, 1930. Serial No. 431,618.

This invention relates to multiple drive apparatus, and more particularly to apparatus of this character which is adapted for use with winches or like machinery.

It is sometimes desirable to operate a plurality of drives from a single power shaft. For instance, the power shaft may be connected to drive either drum of a double drum winch independently of the other, and to also drive other external machinery such as an earth-boring device, pump, or the like.

It is an object of this invention to provide a power shaft with improved equipment by which a plurality of drives may be transmitted from such a shaft independently of each other.

A further object is to provide a simple and comparatively inexpensive arrangement of this character.

These and further objects will be apparent from the following description, when considered in connection with the accompanying drawings in which one embodiment of the invention is illustrated.

Referring to the drawings, Figure 1 illustrates a side elevation in section of the improved device applied to a winch, and Fig. 2 is an end view of Fig. 1.

The improved device as set forth in the drawings consists of supports comprising parallel I-beams 5, 6. These I-beams may be placed in a transverse position on the framework of a truck or the like, and serve to support a winch and a power shaft therefor, as will be presently described.

A casing 6 of substantially cylindrical form lies in a perpendicular position with respect to the I-beams 5, and is suspended from the lower flanges of the I-beams by bolts 7, 7. These bolts may pass through the flanges of said beams and engage bosses on the casing. A central shaft 8 is suitably journaled in the casing and is connected at one end by means of flanges or universal joints to a power shaft 9 which may be driven by a source of power such as a combustion engine. The other end of the shaft 8 may be connected by means of flanges and universal joints to a shaft 10 which may drive auxiliary machinery such as an earth-boring apparatus or the like.

The shaft 8 carries sprockets 11 and 12 which are connected thereto at opposite ends of the casing 6. Each of these sprockets is connected by means of a chain to sprockets 11' and 12' respectively. The latter sprockets each drive an associated drum of a winch through gearing which is connected therewith, as will presently appear.

A substantially cylindrical sleeve 13 is slidably mounted on the shaft 8 and is provided at either end with internal splines or teeth. The sleeve 13 in its idle position, as shown in Fig. 1 of the drawings, is carried by enlarged portions on the shaft 8. These large portions of the shaft consist of a gear 14, which meshes with the internal splines or teeth at one end of the sleeve 13, and a cylindrical portion 15 which acts as a bearing for the other end of said sleeve.

The sprockets 11 and 12 are each provided with integral hubs 16 and 17, respectively. These hubs extend toward each other into the casing 6 and are suitably journaled therein. Blocks 18 are affixed to the inner portions of the hubs by set screws, and these blocks abut the inner roll of a ball bearing to prevent the longitudinal movement of the hubs and associated sprockets. The hubs 16 and 17 are provided at their inner ends with external splined portions or teeth 19 which mesh with either the interior splines or teeth on the sliding sleeve when it is moved axially on the shaft. The meshing of the internal gearing or splined portions 14 of the sliding gear with the teeth 19 on the hub 16 will transmit power through its sprocket 11 to the sprocket 11' of the winch to drive its associated drum. The meshing of the teeth or the internal splined portions 15 of said sleeve with the teeth 19 of the hub 17 will transmit power through its sprocket 12 to the sprocket 12' to drive its associated drum. The shaft 8 and hubs 16 and 17 are suitably journaled in the casing, and proper lubrication for the different elements is provided in said casing.

The sliding sleeve 13 is moved along the shaft 8 in either direction to permit its interior teeth or splines to engage the teeth or splines on the hub 16 or the hub 17 by means of a shifter fork 20. This fork engages a circumferential groove which may be provided at one end of the sleeve, and is mounted on a rod and connected through suitable linkage to a hand lever by which it is manipulated. The interior teeth or spline portions of the sliding sleeve 13 and the enlarged portions 14 and 15 of the shaft are of such dimensions that they are always in engagement. For instance, should the sleeve be moved so that its interior teeth or splines engage with like elements on the hub 16, said teeth or splines will also remain partly engaged with the gear 14 and the member 15 at the opposite end of the sleeve. The same partial engagement of the members 14 and 15 with the enlarged members of the shaft will prevail should the sleeve be moved in the opposite direction. The enlarged members on the shaft 8 thus provide a support for the sleeve at all times. The power supplied by the shaft 8 will be transmitted through the clutch connection between the gear members of the sleeve and the gear member of the sprocket to which it may be connected.

The sprockets 11 and 12 on the driving shaft 8 are connected through chains 20 to the sprockets 11' and 12' on the winch, and serve to transmit power through their associated gearing to a shaft 22. A housing 23 is provided for each gearing and this with the standard 24, in which one end of the shaft 22 is journaled, are mounted on the I-beams 5. The shaft 22 is separated into two portions as shown in Fig. 2. One portion of the shaft carries the drum 25 of the winch and the other carries the drum 26, and said drums are adapted to be rotated independently of each other by power supplied to their individual shaft portions.

In the operation of the improved arrangement power is transmitted to the central shaft which carries the drive sprockets and the sliding sleeve. The central shaft is also connected to an additional shaft by which external machinery is operated. The sliding sleeve when moved along the central shaft in one direction engages the hub of a selected sprocket to cause its rotation. This sprocket in turn transmits power through the chain connected therewith to the sprocket which is associated with the gearing and drum of the winch to cause its rotation. The sleeve when moved in the other direction similarly causes the rotation of the other drum. The drums are thus selectively and independently operated. The sliding sleeve in its normal or neutral position, as shown in Fig. 1, will be disengaged from the sprockets connected with either drum, and it is restored to this position when it is desired to stop the rotation of a drum. The auxiliary shaft connected to the central shaft which operates external machinery such as an earth-boring machine or the like rotates with the central shaft. Clutch mechanism is provided on the auxiliary shaft to connect and disconnect the external machinery.

While the arrangements of this invention have been illustrated as embodied in a certain specific form which has been deemed desirable, it will be understood that they are capable of embodiment in many and widely varied forms without departing from the spirit of the invention as defined in the following claim.

What is claimed is:

A multiple drive apparatus comprising a casing, a driving shaft journaled therein, sprocket members on said shaft, hub members for the sprocket members having gear portions extending into said casing, a tubular sliding member mounted on said shaft between said hub members and having internal teeth, external machinery connected with each sprocket, and means for moving said tubular sliding member to cause its teeth to engage the teeth of one of said hub members to operate the external machinery connected there to the exclusion of the external machinery connected with the other sprocket.

In testimony whereof, we have signed our names to this specification this 24th day of February, 1930.

ALBERT E. FREEMAN.
WILLIAM T. LIVERMORE.